United States Patent [19]

Masuda et al.

[11] 3,868,305

[45] Feb. 25, 1975

[54] PROCESS FOR PRODUCING ETHANOL-ASSIMILATING YEAST

[75] Inventors: Yoshiro Masuda; Kenji Kato; Yoshihiro Takayama; Kenji Kida; Meiseki Nakanishi, all of Ami-machi, Japan

[73] Assignee: Mitsubishi Petrochemical Co., Ltd., Tokyo, Japan

[22] Filed: Oct. 30, 1973

[21] Appl. No.: 410,979

[30] Foreign Application Priority Data
Nov. 17, 1972 Japan................................. 47-115270

[52] U.S. Cl...................... 195/49, 195/82, 426/204
[51] Int. Cl............................................. C12c 11/00
[58] Field of Search .......... 195/49, 82, 28 R, 51, 75

[56] References Cited
UNITED STATES PATENTS
3,674,640    7/1972    Takeda et al.......................... 195/82

Primary Examiner—Lionel M. Shapiro
Assistant Examiner—R. B. Penland
Attorney, Agent, or Firm—Oblon, Fisher, Spinak, McClelland & Maier

[57] ABSTRACT

This invention relates to a process for producing yeast cells which comprises inoculating a new strain of the genus Candida into a culture medium comprising ethanol and culturing under aerobic conditions. A primary object of this invention is to provide an inexpensive yeast of good quality which can be used as a food or as a feed supplement.

9 Claims, No Drawings

PROCESS FOR PRODUCING ETHANOL-ASSIMILATING YEAST

BACKGROUND OF THE INVENTION

1. Field of the Invention

This invention relates to a process for producing yeast cells which comprises cultivating a new strain of the genus Candida in a culture medium comprising ethanol under aerobic conditions.

According to this invention, the desired yeast is produced under cultivation conditions suitable for efficient and economic production by the particular selection of a thermostable strain.

2. Description of the Prior Art

There have been disclosed heretofore some yeasts which are utilizable as a protein source, by which said yeasts assimilate normal paraffins as well as saccharoidal materials. However, the yeast cells obtained wherein normal paraffins are the source of carbon, are accompanied by many problems resolved only with difficulty, for instance, in that a petroleum odor remains which cannot be removed easily by washing. Further, power costs are high since constant agitation is necessary to promote the growth of the yeast, because of the sparing solubility of normal paraffins in water. Still further the oxygen demand and heat requirements are increased for the production of a unit amount of cells due to the absence of oxygen in the paraffin molecule, necessitating additional increases in power costs for oxygen supply and for heat removal.

SUMMARY OF THE INVENTION

Accordingly, it is one object of this invention, to provide an inexpensive yeast of good quality which can be utilized as a food or feed supplement.

This and other objects of this invention have been attained by producing yeast cells by cultivating a strain selected from the group consisting of Candida ethanothermophilum and Candida acidothermophilum in a culture medium comprising ethanol under aerobic conditions.

DETAILED DESCRIPTION OF THE PREFERRED EMBODIMENTS

In view of the state of the prior art as described above, we have made various studies and discovered that ethanol is valuable and efficient as a carbon source in the process of our invention. Ethanol is acceptable as a food supplement as such. Further, ethanol is completely water-soluble and since it contains oxygen it requires little additional oxygen in cultures. Its heat value is high because of the presence of oxygen in the molecule, as compared with normal paraffins. Thus, it should be considered as a superior source of carbon in yeast cell culture. Moreover, ethanol has recently become more readily available at lower cost, since it can be commercially produced on a large scale through hydration of ethylene. Its cost can be further reduced by using the hydration product in an unrectified state and adapting it to the present process.

In order that yeast cells may be inexpensively produced however, on a commercial scale by the use of ethanol as a carbon source, it is necessary to have a high growth rate and high cell yield. Thus, appropriate conditions as to culture temperature and pH of the culture medium are necessary when using ethanol as a substitute for normal paraffins as a carbon source.

As to culture temperature, the culture process takes place at about 30°C or at about 35°C at the most, however it may be desirable to perform at about 40°C in order to reduce the cooling costs. In order to produce yeast cells on a commercial scale, contamination with infectious microbes must be prevented as much as possible. Although, it is desirable to culture under sterile conditions, equipment sufficient to provide such conditions is quite expensive.

It has now been found that contamination with infectious microbes can be reduced to the greatest extent by adjusting the pH of the culture medium to not more than 4.0.

Therefore, it was necessary to discover and isolate a strain of yeast, which would grow well under cultivation conditions including a cultivation temperature of up to 40°C and a pH of the culture medium of not more than 4.0 affording a high growth rate and cell yield, so that yeast cells would be inexpensively produced on a commercial scale through the use of ethanol as a source of carbon. At first, known ethanol-assimilating yeasts were cultured under the above conditions. But many yeasts did not grow at all and if they did grow, the growth rate was so very slow as to be of no commercial or economic advantage. Accordingly, it was necessary to discover a new strain having the above characteristics and we have succeeded in isolating new strains capable of functioning under the above recited conditions in accord with this invention. It is clear from the fungal characteristics as shown in Table I that these are new strains not previously known or described.

Table I

Morphological and physiological properties

| Strain | | C. ethanothermophilum | C. acidothermophilum |
|---|---|---|---|
| | | EY-1010 | EY-1130 |
| ATCC No. | | 20380 | 20381 |
| Deposition No. (in Japan) | | 1677 | 1679 |
| CBS No. | | 6520 | 6521 |
| I. Microscopic observation | | | |
| Size ( ) | *1 | 2.5 – 5    5 – 10 | 3 – 5    5 – 10 |
| Shape | *1 | Oval | Oval |
| Ascospore formation | *2 | Absent | Absent |
| Pseudo-mycelium | *3 | Abundant | Scant |
| II. Giant colony | *4 | | |
| Shape | | Round | Round |
| Margin | | Undulate | Entire or slightly undulate |
| Rising | | Absent | Observed |
| Gloss | | Absent | Dull |
| Surface | | Rough | Smooth |

Table I – Continued

Morphological and physiological properties

| Strain | | | C. ethanothermophilum | C. acidothermophilum |
|---|---|---|---|---|
| | | | EY-1010 | EY-1130 |
| ATCC No. | | | 20380 | 20381 |
| Deposition No. (in Japan) | | | 1677 | 1679 |
| CBS No. | | | 6520 | 6521 |
| III. | Streak culture | *5 | | |
| | Growth | | Good | Good |
| | Pigment | | Creamy white | Creamy white |
| IV. | Liquid culture | *6 | | |
| | Pellicle formation | | Observed | Absent |
| | Turbidity | | Absent | Absent |
| | Sediment | | Observed | Observed |
| V. | Physiological characteristics | | | |
| | (1) Oxygen requirement | | Aerobic | |
| | (2) Growth temperature | | 8–48°C | 8–48°C |
| | (3) Optimum growth temperature | | 35–40°C | 35–40°C |
| | (4) Growth pH | | 2–10 | 2–10 |
| | (5) Optimum growth pH | | 3–8 | 3–8 |
| | (6) Vitamin requirement | | Absent | Absent |
| | (7) Carotenoid formation | | Absent | Absent |
| | (8) Osmo-tolerance (NaCl test) | | 10–12% | –12% |
| | (9) Nitrogen assimilation | | | |
| |     Potassium nitrate | | − | − |
| |     Urea | | + | + |
| |     Ammonium sulfate | | + | + |
| |     Asparagine | | + | + |
| |     Peptone | | + | + |
| | (10) Litmus milk test | | Change to Blue | No change |
| | (11) Gelatin hydrolysis | *7 | Absent | Absent |
| | (12) Excess acids production | | " | " |
| | (13) Starch like compounds production | | " | " |
| | (14) Fat splitting | *8 | " | " |
| | (15) Arbutin splitting | | " | " |
| VI. | Carbon source fermentation | | | |
| | Glucose | | + | + |
| | Galactose | | − | − |
| | Sucrose | | − | − |
| | Maltose | | − | − |
| | Lactose | | − | − |
| | Raffinose | | − | − |
| | Trehalose | | − | − |
| VII. | Carbon source assimilation | | | |
| | D-Glucose | | + | + |
| | D-Galactose | | + | + |
| | L-Sorbose | | − | − |
| | Sucrose | | + | + |
| | Maltose | | − | − |
| | Cellobiose | | − | − |
| | Trehalose | | − | − |
| | Lactose | | − | − |
| | Melibiose | | − | − |
| | Raffinose | | + | + |
| | Melezitose | | + | + |
| | Inulin | | + | + |
| | Soluble starch | | − | − |
| | Xylose | | + | − |
| | L-Arabinose | | − | − |
| | D-Ribose | | − | − |
| | Glycerol | | + | + |
| | Erythritol | | − | − |
| | Ribitol | | − | − |
| | Galactitol | | − | − |
| | Glucitol | | − | − |
| | Inositol | | − | − |
| | α-Methylglucoside | | − | − |
| | Salicin | | − | − |
| | Lactate | | + | + |
| | Succinate | | + | + |
| | Citrate | | + | + |
| | Ethanol | | + | + |

*1: Observed after 3 days cultivation at 25°C in a malt extract medium (Ballg. 10 degree, pH 5.0)
*2: Gypsum brock, Gorodkowa-agar
*3: Slide culture in a potato-glucose-agar medium
*4: A malt extract medium (Ballg. 10 degree, pH 5.0) having 2% agar incorporated.
*5: Same medium as in *4
*6: Same procedures as in *1
*7: A malt extract medium (Ballg. 10 degree, pH 5.0) having 20% gelatin incorporated.
*8: Beef tallow used As can be seen from the above, the two strains of the yeast of this invention have been isolated and identified as new species belonging to the genus Candida and are also considered as two separate species in classification. From the comparative studies of the aforesaid data with "The Yeast" by J. Lodder and J. W. Kreger-VanRij, 1970 Ed., it can be clearly concluded that both strains described belong to the genus Candida in view of their properties such as the morphological characteristics of being oval and asporogenous with pseudomycelium formation, no odium formation and further, the physiological characteristics of producing carotenoids and strong acids without formation of any starch-like materials.

From the more precise morphological and physiological studies on species of the strains EY-1010 and EY-1130, it can be concluded that these strains are new species in view of the fact that neither the identical known strains, nor comparable known strains, were found.

By comparison of the strain EY-1010 with the strain EY-1130, it can be concluded that both strains belong to different species, respectively, in view of their morphological characteristics based on morphotype of giant colony formation and formation of pseudomycelium and Pellicle as well as their physiological characteristics of their behavior in litmus milk medium and xylose.

These strains, EY-1010 and EY-1130, are named Candida ethanolthermophilum and Candida acidothermophilum, respectively.

The two strains of the present invention have been deposited under accession Nos. 1677 and 1679, respectively, with the Technical Research Institute of Microbial Industry, Agency of Industrial Science and Technology, Ministry of International Trade and Industry, Japan and as ATCC Nos. 20380 and 20381, respectively, with the American Type Culture Collection in Washington, D. C., USA and also CBS Nos. 6520 and 6521 with Centraalbureau Voor Schimmelcultures, Julianalaan 67A, Delft, The Netherlands.

The ethanol concentration in the culture medium is usually within a range of 5% or less and preferably 2% or less.

The nutrients other than carbon sources which may be employed in this invention may be any of those commonly utilized for the cultivation of yeast. More specifically, as a source of nitrogen any assimilable nitrogen source may be employed, for instance, soybean meal, defatted soybean meal, cotton seed meal, polypeptone, meat extract, yeast extract, corn steep liquor, casein hydrolyzate, urea, ammonia or its salts. As an inorganic salt there may be used, for instance, salts of phosphoric acid such as magnesium, potassium or iron. As desired, a wide variety of inorganic and organic materials may be advantageously added to a culture medium for the growth of yeast.

Cultivation in the process of this invention may be advantageously effected with aeration and agitation, and cultivation may be effected in a batchwise, a semi-batchwise or a a continuous manner. Cultivation temperatures can be advantageously about 40°C, but a temperature ranging from 30°C to 35°C may be suitably employed.

The selection of the pH of the culture medium will depend upon a combination of factors, for instance cost and the type of materials of the fermentation tank, considered as to safety from contamination with infectious microbes, but it is usually about 2.5–4.0 and preferably 3.0–3.5.

The yeast cells may be separated from the cultured broth and purified by any conventional method. For instance, the cells may be separated by such means as filtration, centrifuging or the like, and then purified by washing with water or, if desired, other suitable washing liquids. It is one of the advantages of this invention that sufficient washing normally can be made by using only water.

After separation and purification, the yeast cells may be optionally processed depending upon the intended use thereof, but one may utilize any means commonly employed in the art, such as, for example, storage in raw state without processing, heating, drying, freezing and the like.

According to the process of this invention, yeasts, which are utilizable as a source of high nutrition and high energy may be easily produced on a commercial scale by the use of ethanol and, therefore, posesses economically advantageous uses as a foodstuff and feedstuff additive.

This invention is more fully illustrated by the following examples, but they are given only for the purpose of illustrating this invention without any intention of limiting the scope of this invention. In these examples, percents are given by W/V unless otherwise indicated.

EXAMPLE 1

A liquid culture medium containing 0.15% $KH_2PO_4$, 0.15% $Na_2HPO_4$, 0.1% $MgSO_4.7H_2O$, 0.005% $FeSO_4.7H_2O$, 0.001% $MnSO_4.5H_2O$, 0.001% $CaCl_2.2H_2O$, 0.1% corn steep liquor and 0.025% $(NH_4)_2SO_4$ is adjusted to pH 3.5 by the addition of sulfuric acid.

Into a 30 l. ferment jar is charged 17 l. of the above medium and after steam sterilization at 120°C, for 10 minutes, 170 g. of ethanol are added thereto. Then, 200 cc. of the seed culture of Candida ethanothermophilum, which was previously cultivated at 30°C for 15 hours in a liquid culture medium of the same formulation as mentioned above (except that 0.4% $CO(NH_2)_2$ is employed instead of the $(NH_4)_2SO_4$ and pH is 4.0), is aseptically charged into the ferment jar and cultivation is effected for 13 hours at a rotation of 500 rpm, an aeration of 17 l/min., a temperature of 40°C and pH 3.5.

After completion of the cultivation, a 50 ml. portion of the cultured broth is taken out and centrifuged for 10 minutes at 4000 rpm to separate the cells. The cells thus separated are washed once with distilled water and again subjected to a separation by centrifuging as above. The cells thus obtained are dried at 70°C under a reduced pressure of 20 mm Hg to yield 0.42 g of dried cell, which corresponds to 84% by weight of the ethanol employed. Also, it was found that a specific growth rate ($\mu$max) in the cultivation is 0.45 $hr^{-1}$ during the logarithmic growth phase.

EXAMPLES 2 AND 3

Following substantially the same cultivation procedure as set forth in the Example 1, except that cultivation is effected at 35°C instead of the 40°C and the two strains as identified below are employed, results are obtained which are summarized in Table II.

TABLE II

| Example | Strain | Cell yield (wt%) | $\mu$max ($hr^{-1}$) |
|---|---|---|---|
| 2 | Candida ethanothermophilum | 85 | 0.46 |
| 3 | Candida acidothermophilum | 86 | 0.42 |

EXAMPLE 4

The substantially same procedure as set forth in Example 1 is employed except that, when the cell content goes up to 8.0 g/l, a culture medium having the same formulation as set forth in the above Example 1 together with 1% of ethanol is charged into the ferment jar at a given rate, while the cultured broth is being removed therefrom, so as to maintain the space velocity of 5.1 hr$^{-1}$. Then, the cultured broth thus removed is treated in the same manner as given in the Example 1 and thereafter the weight of the dried cells is determined. There was found 0.93 g of dried cells per 100 cc of the cultured broth. Analytical data of the so obtained cells are summarized in Tables III and 4.

TABLE III

Constitution of cell

| | |
|---|---|
| Moisture | 3.78% |
| Total nitrogen | 8.46% |
| Fat | 0.61% |
| Total phosphorus | 1.49% |
| Ash | 7.97% |
| Total sugar | 29.10% |

TABLE IV

Amino acid constitution of cell

| | | | |
|---|---|---|---|
| Lysine | 10.6% | Leucine | 7.2% |
| Histidine | 2.8% | Tyrosine | 3.7% |
| Arginine | 5.9% | Pherylalanine | 4.2% |
| Aspartic acid | 11.1% | Glutamic acid | 15.1% |
| Threonine | 6.1% | Proline | 2.4% |
| Serine | 5.5% | Glycine | 4.7% |
| Valine | 5.6% | Alanine | 6.1% |
| Methionine | 1.6% | NH$_3$ | 2.4% |
| Isoleucine | 5.0% | | |
| | | | 100.0% |

(Amino acid residue other than Tryptophane and Cysteine are defined as 100).

EXAMPLE 5

Following substantially the same procedures as set forth in Example 4, except that a reaction product derived from hydration of ethylene (24.6% ethanol, 71.5% water and 3.9% other materials) is employed (in such a concentration to be equal to the ethanol concentration utilized in the above Example 4) instead of the pure ethanol, the cultured broth contains dried cells at a ratio of 0.95 g/100 cc, which correspond to 95% based upon the ethanol employed.

Having now fully described the invention, it will be apparent to one of ordinary skill in the art that many changes and modifications can be made thereto without departing from the spirit or scope of the invention as set forth herein.

What is claimed as new and intended to be covered by letters patent is

1. A process for culturing yeast cells which comprises cultivating a strain selected from the group consisting of *Candida ethanothermophilum* and *Candida acidothermophilum* belonging to the genus Candida in a culture medium containing ethanol under aerobic conditions.

2. The process according to claim 1, wherein ethanol obtained by fermentation or as a hydration product of ethylene, containing not less than about 20% of ethanol, is employed as a source of carbon.

3. The process according to claim 1, wherein said cultivation is effected at a pH range of said culture medium of about 2.5 to 4.0.

4. The process according to claim 1, wherein said cultivation is effected at a temperature of about 30°C to 40°C.

5. The process according to claim 1, wherein said culture medium contains as a source of nitrogen a member of the group consisting of soybean meal, defatted soybean meal, cotton seed meal, polypeptone, meat extract, yeast extract, corn steep liquor, casein hydrolyzate, urea or its salt, or mixtures thereof.

6. The process according to claim 1, wherein said culture medium contains as an inorganic salt magnesium phosphate, potassium phosphate or iron phosphate.

7. The process according to claim 1, wherein said cultivation is effected in a batchwise, semibatchwise or continuous manner.

8. The process according to claim 1, wherein said culture medium contains not more than 2% (W/V) of ethanol.

9. The process according to claim 1, wherein said strain is selected from the group consisting of ATCC 20380 and 20381.

* * * * *